United States Patent
Burghal et al.

(10) Patent No.: US 12,250,576 B2
(45) Date of Patent: Mar. 11, 2025

(54) METHODS FOR DYNAMIC BEAMFORMING WEIGHT CONSTRUCTION BASED ON DIRECTIONAL MEASUREMENTS

(71) Applicant: QUALCOMM Incorporated, San Diego, CA (US)

(72) Inventors: Daoud Abdelhafiz Burghal, San Diego, CA (US); Raghu Narayan Challa, San Diego, CA (US); Vasanthan Raghavan, West Windsor Township, NJ (US); Farhad Meshkati, San Diego, CA (US); Ruhua He, San Diego, CA (US); Ting Kong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 17/690,816

(22) Filed: Mar. 9, 2022

(65) Prior Publication Data
US 2023/0292154 A1   Sep. 14, 2023

(51) Int. Cl.
*H04W 24/08* (2009.01)
*H04B 7/06* (2006.01)
*H04L 5/00* (2006.01)

(52) U.S. Cl.
CPC .......... *H04W 24/08* (2013.01); *H04B 7/0617* (2013.01); *H04L 5/0048* (2013.01)

(58) Field of Classification Search
CPC . H04L 25/021; H04L 25/0224; H04L 5/0048; H04B 7/043; H04B 7/0617; H04B 7/0634; H04B 7/0695; H04W 24/08
See application file for complete search history.

(56) References Cited

U.S. PATENT DOCUMENTS

| | | |
|---|---|---|
| 2017/0331544 A1 | 11/2017 | Athley et al. |
| 2018/0368149 A1 | 12/2018 | Raghavan et al. |

(Continued)

FOREIGN PATENT DOCUMENTS

WO   WO-2021066707 A1   4/2021

OTHER PUBLICATIONS

Ray Horak, "Webster's New World Telecom Dictionary," 2008 Wiley Publishing Inc, p. 83 (Year: 2008).*

(Continued)

*Primary Examiner* — Mohammad S Anwar
(74) *Attorney, Agent, or Firm* — QUALCOMM Incorporated

(57) ABSTRACT

Methods, systems, and devices for wireless communications are described. A first device may monitor for a set of reference signals from a second device using a set of directional beams. The first device may perform measurements on the received reference signals and select a subset of directional beams from the set of directional beams based on the performed measurements. Each directional beam may be associated with a set of beamforming weights. The first device may communicate with the second device using a dynamic set of beamforming weights. The first device may form the dynamic set of beamforming weights using a combination of beamforming weights from each set of beamforming weights associated with the subset of directional beams. The dynamic set of beamforming weights may be different from each set of beamforming weights associated with the subset of directional beams.

25 Claims, 10 Drawing Sheets

(56) References Cited

U.S. PATENT DOCUMENTS

2021/0377878 A1* 12/2021 Sundman ............ H04W 52/245
2022/0021493 A1* 1/2022 Raghavan ............ H04B 7/0695

OTHER PUBLICATIONS

International Search Report and Written Opinion—PCT/US2023/014050—ISA/EPO—May 24, 2023 (2105078WO).

\* cited by examiner

METHODS FOR DYNAMIC BEAMFORMING WEIGHT CONSTRUCTION BASED ON DIRECTIONAL MEASUREMENTS

FIELD OF TECHNOLOGY

The following relates to wireless communications, including methods for dynamic beamforming weight construction based on directional measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communication devices (e.g., base stations, UEs) may support beamforming operations in which multiple antennas are used to generate directional beams for transmitting and receiving communications. Wireless communication devices may, in some cases, use a codebook to determine beamforming weights for generating directional beams.

SUMMARY

The described techniques relate to improved methods, systems, devices, and apparatuses that support methods for dynamic beamforming weight construction based on directional measurements. Generally, a first device may monitor for a set of reference signals from a second device using a set of directional beams. The first device may perform measurements on the received reference signals and select a subset of directional beams from the set of directional beams based on the performed measurements. Each directional beam may be associated with a set of beamforming weights (e.g., based on a beamforming codebook). The first device may communicate with the second device using a dynamic set of beamforming weights. The dynamic set of beamforming weights may be different from each set of beamforming weights associated with the subset of directional beams. For example, the first device may form the dynamic set of beamforming weights using a combination of beamforming weights associated with the subset of directional beams. Using a directional beam that is based on the dynamic set of beamforming weights, the first device may reduce processing and power consumption while improving performance and throughput when communicating with (e.g., transmitting messages to, receiving messages from) the second device.

A method for wireless communication at a first device is described. The method may include monitoring for a set of reference signals from a second device using a set of directional beams, selecting, by the first device, a subset of directional beams from the set of directional beams based on performing one or more measurements of the set of reference signals received on the set of directional beams, each directional beam of the subset of directional beams being associated with a set of beamforming weights, and communicating with the second device using a dynamic set of beamforming weights that is formed using a combination of beamforming weights from each set of beamforming weights associated with the subset of directional beams, where the dynamic set of beamforming weights is different from each set of beam weights associated with the subset of directional beams.

An apparatus for wireless communication at a first device is described. The apparatus may include a processor, memory coupled with the processor, and instructions stored in the memory. The instructions may be executable by the processor to cause the apparatus to monitor for a set of reference signals from a second device using a set of directional beams, select, by the first device, a subset of directional beams from the set of directional beams based on performing one or more measurements of the set of reference signals received on the set of directional beams, each directional beam of the subset of directional beams being associated with a set of beamforming weights, and communicate with the second device using a dynamic set of beamforming weights that is formed using a combination of beamforming weights from each set of beamforming weights associated with the subset of directional beams, where the dynamic set of beamforming weights is different from each set of beam weights associated with the subset of directional beams.

Another apparatus for wireless communication at a first device is described. The apparatus may include means for monitoring for a set of reference signals from a second device using a set of directional beams, means for selecting, by the first device, a subset of directional beams from the set of directional beams based on performing one or more measurements of the set of reference signals received on the set of directional beams, each directional beam of the subset of directional beams being associated with a set of beamforming weights, and means for communicating with the second device using a dynamic set of beamforming weights that is formed using a combination of beamforming weights from each set of beamforming weights associated with the subset of directional beams, where the dynamic set of beamforming weights is different from each set of beam weights associated with the subset of directional beams.

A non-transitory computer-readable medium storing code for wireless communication at a first device is described. The code may include instructions executable by a processor to monitor for a set of reference signals from a second device using a set of directional beams, select, by the first device, a subset of directional beams from the set of directional beams based on performing one or more measurements of the set of reference signals received on the set of directional beams, each directional beam of the subset of directional beams being associated with a set of beamforming weights, and communicate with the second device using a dynamic set of beamforming weights that is formed using a combination of beamforming weights from each set of beamforming weights associated with the subset of directional beams, where the dynamic set of beamforming weights is different from each set of beam weights associated with the subset of directional beams.

Some examples of the method, apparatuses, and non-transitory computer-readable medium described herein may further include operations, features, means, or instructions for determining, based on the one or more measurements, a covariance matrix associated with a subset of antenna elements of a set of antenna elements at the first device and each set of beamforming weights associated with the subset of directional beams and determining one or more eigenvectors associated with the covariance matrix, where the one or more eigenvectors satisfy a threshold, and where the combination may be based on the one or more eigenvectors.

Some examples of the method, apparatuses, and non-transitory computer-readable medium described herein may further include operations, features, means, or instructions for generating each directional beam of the set of directional beams based on a respective set of beamforming weights, where each respective set of beamforming weights corresponds to a direction of a set of multiple directions, and where receiving the set of reference signals using the set of directional beams may be based on generating each directional beam.

In some examples of the method, apparatuses, and non-transitory computer-readable medium described herein, each beamforming weight of the respective set of beamforming weights includes a weighting applied to an antenna element of a subset of antenna elements at the first device.

In some examples of the method, apparatuses, and non-transitory computer-readable medium described herein, each reference signal of the set of reference signals excites a multi-path component of a set of multi-path components, each multi-path component including a respective signal path between the first device and the second device.

Some examples of the method, apparatuses, and non-transitory computer-readable medium described herein may further include operations, features, means, or instructions for determining an angle of arrival associated with each multi-path component of the set of multi-path components, where selecting the subset of directional beams may be based on the angle of arrival associated with each multi-path component of the set of multi-path components.

Some examples of the method, apparatuses, and non-transitory computer-readable medium described herein may further include operations, features, means, or instructions for determining a performance metric associated with communications between the first device and the second device, where a number of directional beams including the subset of directional beams may be based on the performance metric.

In some examples of the method, apparatuses, and non-transitory computer-readable medium described herein, the performance metric includes a link budget, an effective spectral efficiency, a block error rate (BLER), a signal-to-interference-plus-noise ratio (SINR), a signal-to-noise ratio (SNR), or a reference signal received power (RSRP) ratio.

In some examples of the method, apparatuses, and non-transitory computer-readable medium described herein, selecting the subset of directional beams may include operations, features, means, or instructions for determining, based on the one or more measurements, one or more directional beams of the set of directional beams that satisfy a threshold, where the subset of directional beams includes the one or more directional beams that satisfy the threshold.

In some examples of the method, apparatuses, and non-transitory computer-readable medium described herein, the first device includes a network entity and each reference signal of the set of reference signals includes a sounding reference signal (SRS).

In some examples of the method, apparatuses, and non-transitory computer-readable medium described herein, the first device includes a user equipment and each reference signal of the set of reference signals includes a synchronization signal block (SSB), a channel state information reference signal (CSI-RS), or a demodulation reference signal (DMRS), or any combination thereof.

In some examples of the method, apparatuses, and non-transitory computer-readable medium described herein, the one or more measurements include one or more RSRP measurements or one or more SINR measurements.

In some examples of the method, apparatuses, and non-transitory computer-readable medium described herein, the combination may be based on maximum ratio combining, or equal gain combining, or one or more optimum combining strategies, or any combination thereof.

In some examples of the method, apparatuses, and non-transitory computer-readable medium described herein, the first device includes a user equipment (UE) and each reference signal of the set of reference signals may be transmitted using one or more millimeter wave (mmW) carrier frequencies.

In some examples of the method, apparatuses, and non-transitory computer-readable medium described herein, the one or more mmW carrier frequencies may be greater than about 24.25 gigahertz.

In some examples of the method, apparatuses, and non-transitory computer-readable medium described herein, the first device includes a network entity and each reference signal of the set of reference signals may be transmitted using one or more carrier frequencies.

DETAILED DESCRIPTION

Figure 1:
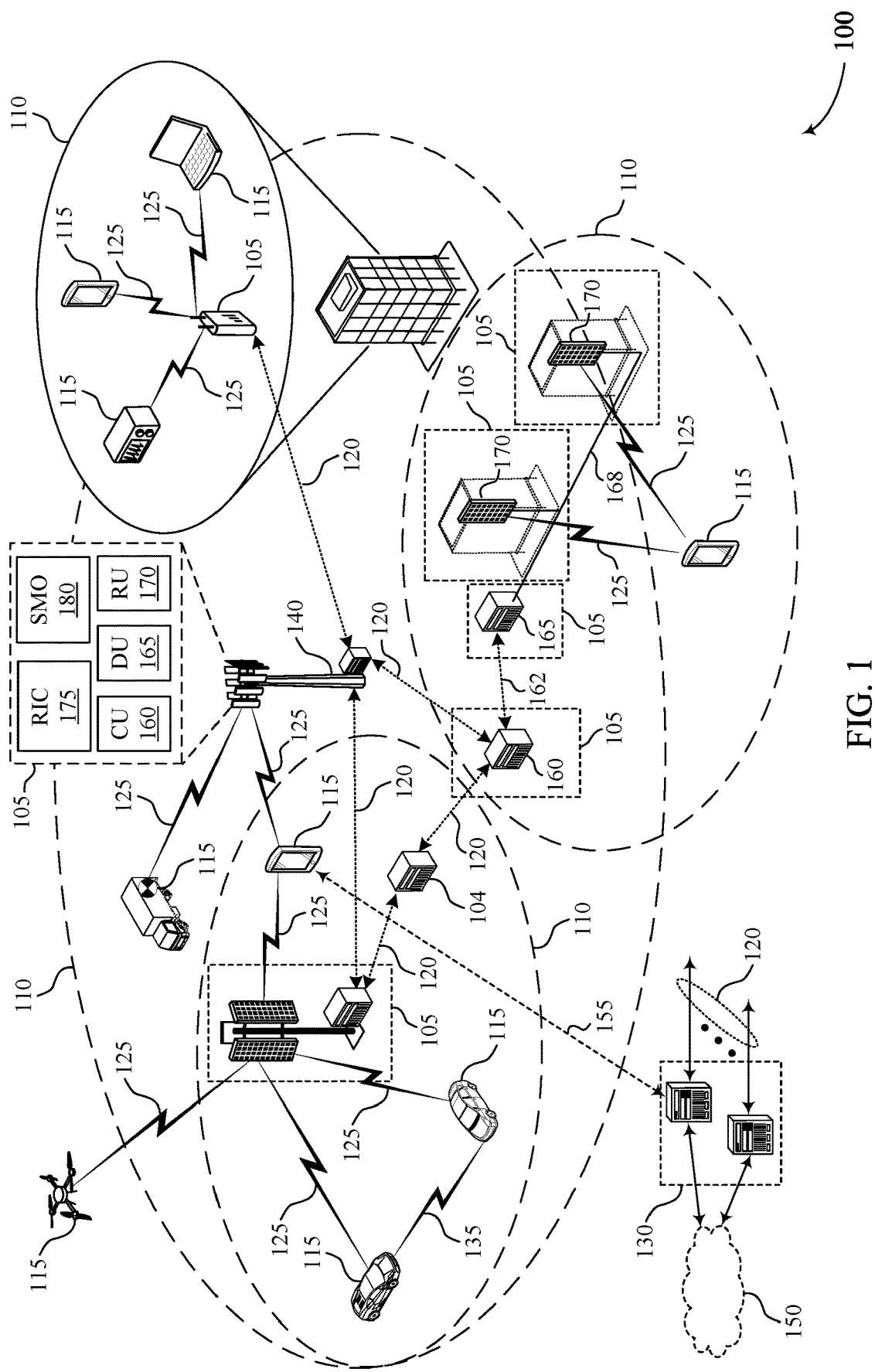
FIGS. 1 and 2 each illustrate an example of a wireless communications system that supports methods for dynamic beamforming weight construction based on directional measurements in accordance with aspects of the present disclosure.

In some wireless communications systems, such as systems that support millimeter wave (mmW) communications (e.g., new radio (NR) systems), wireless communication devices (e.g., network entities, transmission/reception points (TRPs), user equipments (UEs)) may communicate via directional transmissions (e.g., beams). For example, communications between communications devices operating within a wireless communications system may be carried out via beamforming. In such cases, some wireless communication devices (e.g., the network entities and the UEs) may support beamforming operations in which antenna elements (e.g., of an antenna array) may be used to generate directional beams for transmitting or receiving communications. In some examples, a first communication device may apply a respective phase and amplitude (e.g., weight) to each of multiple antenna elements (e.g., of an antenna array) to generate a beam in a particular direction for communications with a second communication device. That is, the first device may determine a suitable combination of antenna weights to apply to a set of antenna elements for generating a beam in a particular direction.

As the number of antennas (e.g., antenna elements) at the communication device increases, for example, to satisfy a link budget for communications within a mmW communications system, the number of possible antenna weight combinations (e.g., the number of directions in which a beam may be generated) may also increase. As a result, processing and power consumption at the first communication device may also increase. Moreover, channel conditions may change relatively frequently (e.g., on the order of milliseconds (ms)) and, as such, the direction (e.g., and corresponding antenna weight combination) for communications with the second device may also change. Therefore, rather than determining (e.g., calculating) a suitable antenna weight combination, the communication device may select an antenna weight combination (e.g., a beamforming direction) from a predefined codebook. For example, the first device may select a suitable antenna weight combination based on channel information obtained from reference signal measurements. However, the number of beamforming weights included in the codebook may be rigid (e.g., due to a capacity of memory storage at the device) and situations may occur in which a suitable beamforming direction may not be available through the weights included in the codebook. Therefore, mechanisms that enable a device to dynamically determine a suitable combination of beamforming weights may be desirable.

As described herein, techniques for constructing a dynamic beam from multiple static (e.g., preconfigured) directional beams may be used to reduce processing and power consumption at a communications device. For example, a first communication device (e.g., the UE or the network entity) may perform beam quality measurements (e.g., reference signal received power (RSRP) measurements, signal-to-interference-plus-noise ratio (SINR) measurements, or the like) on multiple directional beams used for receiving reference signals from a second communication device (e.g., another UE or another network entity). In some examples (e.g., if the second communication device is the network entity), the reference signals may include synchronization signal blocks (SSBs), channel state information reference signals (CSI-RSs), demodulation reference signals (DMRSs), among other examples. In other examples (e.g., if the second communication device is the UE), the reference signals may include sounding reference signals (SRSs), or some other reference signals transmitted by the UE. The first communication device may select a number of directional beams (K) determined to have a relatively high or otherwise acceptable signal strength compared to other measured beams (e.g., where measurements associated with the K directional beams may satisfy a threshold). The first communication device may combine (e.g., via maximum ratio combining) the antenna weights of each selected directional beam to form a dynamic set of beamforming weights (e.g., for generating a dynamic beam) for communications with the second device. In some examples, the dynamic set of beamforming weights may increase the receive power (e.g., or the transmit power) at the first device.

Particular aspects of the subject matter described herein may be implemented to realize one or more potential advantages associated with techniques for constructing a dynamic beam from multiple directional beams using maximum ratio combining. For example, the described techniques may support reduce processing and power consumption while improving performance at the first communication device.

Aspects of the disclosure are initially described in the context of wireless communications systems. Aspects of the disclosure are further illustrated by and described with reference to a process flow, apparatus diagrams, system diagrams, and flowcharts that relate to methods for dynamic beamforming weight construction based on directional measurements.

FIG. 1 illustrates an example of a wireless communications system 100 that supports methods for dynamic beamforming weight construction based on directional measurements in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support methods for dynamic beam construction based on directional measurements as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

A communications device (e.g., a UE 115, a base station 140, a TRP) operating within the wireless communications system 100, may include one or more antennas for communicating with other communications device. As the number of antennas at the communications device increases, the number of possible antenna weight combinations to be used for generating directional beams may also increase, resulting in increased processing and power consumption at the communication device. As such, determining a suitable combination of beamforming weights based on static directional beams may be prohibitive for the communications device.

In some examples, however, the wireless communications system 100 may support one or more aspects of techniques for constructing a dynamic beam from multiple directional beams (e.g., using maximum ratio combining). For example, a first device (e.g., the UE 115 or the base station 140) may monitor for a set of reference signals (e.g., SSBs, CSI-RSs, DMRS, or SRSs) from a second device (e.g., another UE 115 or another base station 140) using a set of directional beams. The first device may perform measurements (e.g., RSRP measurements, SINR measurements, or both) on the received reference signals and select a subset of directional beams from the set of directional beams based on the performed measurements. Each directional beam may be associated with a set of beamforming weights (e.g., corresponding to a particular direction). The first device may communicate with the second device using a dynamic set of beamforming weights different from each set of beamforming weights associated with the subset of directional beams. For example, the first device may form the dynamic set of beamforming weights using a combination of beamforming weights from each set of beamforming weights associated with the subset of directional beams. The present disclosure may therefore promote reduced processing and increased performance, among other benefits.

Figure 2:
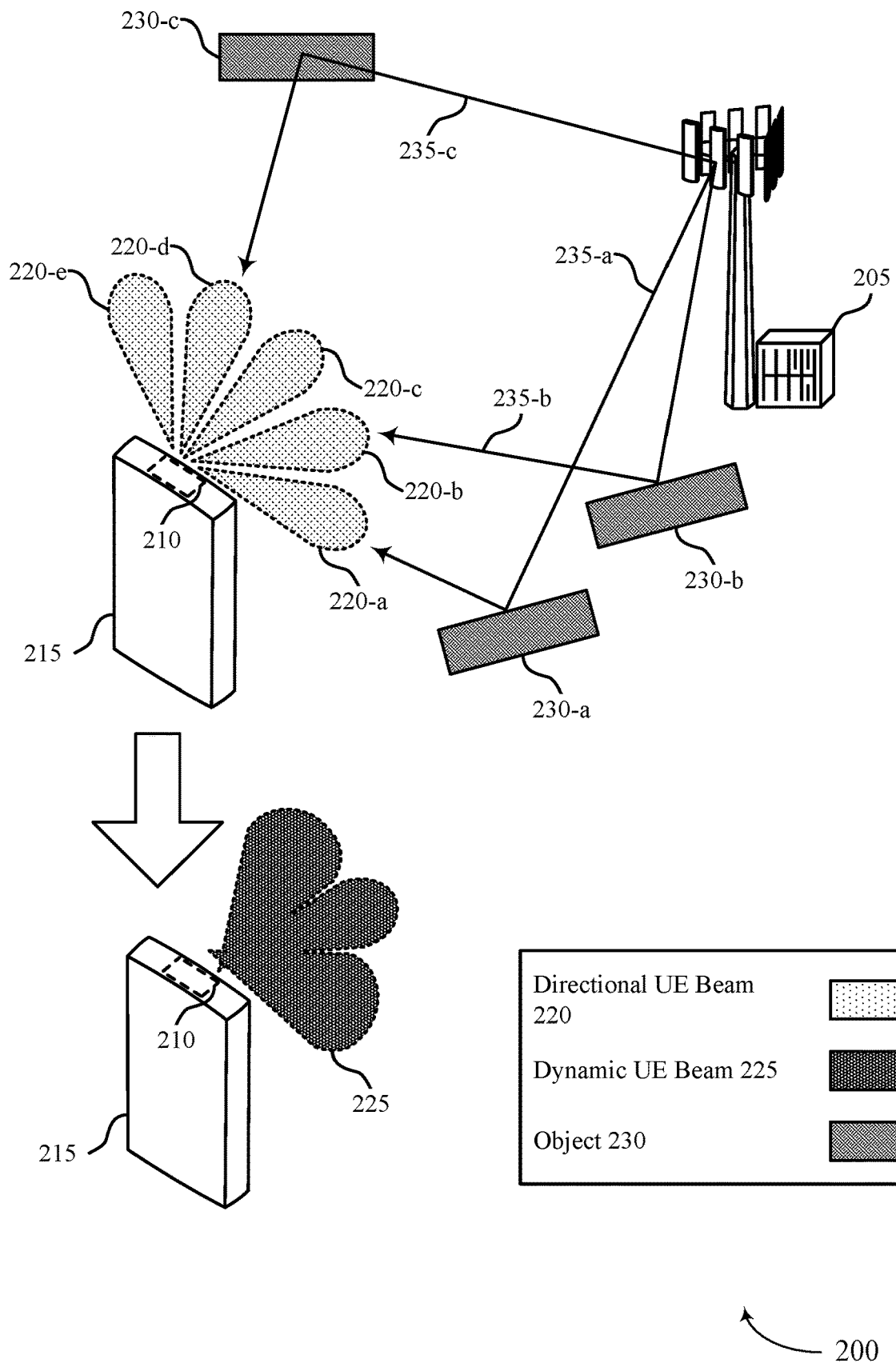

FIG. 2 illustrates an example of a wireless communications system 200 that supports methods for dynamic beamforming weight construction based on directional measurements in accordance with aspects of the present disclosure. The wireless communications system 200 may implement or be implemented by aspects of the wireless communications system 100. For example, the wireless communications system 200 may include a network entity 205 and a UE 215, which may be examples of the corresponding devices described with reference to FIG. 1. The wireless communications system 200 may include features for improved communications between the UE 215 and the network entity 205, among other benefits. In some examples of the wireless communications systems 200, the actions performed by the UE 215 may be performed by other communication device, such as the network entity 205 Additionally or alternatively, the actions performed by the network entity 205 may be performed by other communication device, such as the UE 215.

The UE 215 may communicate with the network entity 205 using beamforming techniques. For example, the UE 215 may communicate with the network entity 205 via one or more directional UE beams 220. In some examples, the communications illustrated in FIG. 2 may include downlink transmissions to the UE 215, where the directional UE beams 220 may be reception beams. Additionally or alternatively, the communications illustrated in FIG. 2 may include uplink transmissions (or sidelink transmissions to one or more other UEs (not shown)) from the UE 215, where the directional UE beams 220 may be transmission beams. The UE 215 may include an antenna array 210 configured to transmit or receive beamformed transmissions (e.g., using the directional UE beams 220). The UE 215 may include one or more additional antenna arrays 210 (not shown).

The antenna array 210 may include a set of antenna elements. For example, the UE 215 (e.g., and the network entity 205) may use multiple antennas (e.g., antenna elements) for directional communications in the wireless communication system (e.g., in a mmW communications system). That is, a transmitting device (e.g., the network entity 205 or the UE 215) may use multiple antenna elements to transmit signals (e.g., one or more reference signals) using one or more carrier frequencies. In some examples (e.g., if the transmitting device is the UE 215), the one or more carrier frequencies may be mmW carrier frequencies (e.g., greater than about 24.25 GHz).

Beamforming (e.g., directional beamforming) via multiple antennas may be used to satisfy a performance metric (e.g., a link budget, a spectral efficiency (SPEFF), a block error rate (BLER), an SINR, an SNR, or an RSRP) associated with communications (e.g., transmitting or receiving signals) between communications device (e.g., the UE 215 and the network entity 205) operating within the wireless communications system 200. For example, the UE 215 may use multiple antennas (e.g., directional beamforming via multiple antenna) to improve the received signal strength of communications from the network entity 205. In some examples, the UE 215 (e.g., and the network entity 205) may use codebook-based directional beamforming. For example, beamforming operations, such as beam training, performed at the UE 215 may be based on a codebook in which codewords (e.g., associated with a combination of weights for respective antenna elements at the UE 215) may be configured (e.g., predefined) at the UE 215 and the network entity 205. That is, each codeword of the codebook may be used by the UE 215 to generate a beam in a particular direction.

In some examples, the number of beamforming weight combinations (e.g., associated with a respective codeword) may be rigid (e.g., fixed). For example, the codebook may be stored in memory (e.g., radio frequency identification (RFID) memory) at the UE 215 (e.g., and the network entity 205). However, due to a rigid memory storage capacity (e.g., and complexities associated with determining possible beamforming weight combination), the number of codewords in in the codebook may be static (e.g., fixed). As such, beamforming operations with such a codebook may be referred to as static codebook beamforming (e.g., a static codebook approach to beamforming). In some examples of static codebook beamforming, scenarios may occur in which a suitable beamforming direction (e.g., or suitable combinations of beamforming weights) may not be included in the codebook. As a result, scenarios may occur in which the UE 215 may determine to use dynamic (e.g., adaptive) beamforming weights beyond what may be included in the codebook.

However, constructing dynamic beamforming weights (e.g., a dynamic set of beamforming weights) at the UE 215 may increase the number of measurements to be performed by the UE 215 and, accordingly, increase the processing and power consumption at the UE 215. For example, the UE 215 may use a maximum ratio combining scheme (e.g., direct maximum ratio combining) to construct the dynamic set of beamforming weights. However, the quality of the dynamic set of beamforming weights determined by the UE 215 may be influenced by (e.g., may increase with) the number of measurements performed at the UE 215, for example due to latency (e.g., associated with the channel becoming outdated or changing) and noise associated with performing measurements at a relatively low SNR.

In some examples, to improve coverage, diversity, and cost effectiveness, the number of antennas at a communication device (e.g., the UE 215) may be increased. For example, the UE 215 (e.g., and other customer premise equipments (CPEs) operating within the wireless communications system 200, not shown) may use multiple antenna arrays, which may each include multiple modules (e.g., panels), to improve coverage (e.g., signal coverage area), diversity (e.g., signal diversity), and cost effectiveness. However, the number of measurements to be performed by the UE 215 may be based on (e.g., may scale with) the number of antennas at the UE 215 and may become prohibitive for the UE 215 as the number of antennas at the UE 215 exceeds a threshold. As a concrete example, the number of measurements to be performed by a CPE with 64 antennas may result in a latency at the CPE that may exceed a coherence time threshold (e.g., up to hundreds of ms). Moreover, measurements performed on signals with a reduced SNR may increase the likelihood of erroneous estimates. For example, a pre-beamforming SNR (e.g., −10 dB), may result in unreliable phase and power estimates (e.g., measurements).

Therefore, to decrease the processing and power consumption at the UE 215, while improving the performance, the UE 215 may use static (e.g., directional) beams as the basis for constructing the dynamic beamforming weights. That is, the UE 215 may determine a suitable beamforming weight combination (a dynamic set beamforming weights) by combining beamforming weights of directional beams (e.g., two or more directional UE beams 220). For example, a dynamic beam (e.g., generated using a dynamic set of beamforming weights) which increases the received power at the UE 215 may be constructed with a linear combination of multi-path components (e.g., in the environment of the UE 215). For example, signals transmitted from the network entity 205 may experience multi-path propagation, such that the transmitted signals (e.g., reference signals) may reach the UE 215 by multiple (e.g., more than two) paths.

For example, signals transmitted from the network entity 205 may reach the UE 215 via one or more paths 235 (e.g., a path 235-a, a path 235-b, and a path 235-c). Multi-path propagation may result from atmospheric ducting, refraction, or reflection off of objects in the surrounding area. For example, signals transmitted from the network entity 205 may interact with nearby reflectors (e.g., buildings, humans, vehicles, and the like) prior to arriving at the UE 215. In other words, signals transmitted by the network entity 205 may each excite a multi-path component, which may include a respective path between the network entity 205 and the UE 215 (e.g., the path 235-a, the path 235-b, and the path 235-c). In some examples, reflectors may be referred to as objects. For example, the network entity 205 may transmit signals to the UE 215 and at least a portion of a signal may reflect off of one or more objects 230 (e.g., an object 230-a, an object 230-b, and/or an object 230-c) towards the UE 215. In some examples, multi-path propagation may result in interference and phase shifting of the transmitted signals (e.g., multi-path interference or multi-path distortion), which may affect the signals prior to detection at the UE 215. As such, the UE 215 may exploit multi-path propagation to determine a dynamic beam (e.g., a dynamic set of beamforming weights) for communications with the network entity 205.

In some examples, the UE 215 may treat (e.g., view) the directional UE beams 220 as virtual antennas and use antenna selection and antenna combining to determine the dynamic set of beamforming weights. For example, the UE 215 may estimate the angle of arrival (e.g., and power) of multi-path components by steering (e.g., generating) directional beams (e.g., relatively narrow directional beams) toward different directions. For example, the UE 215 may use a beam sweeping procedure (e.g., as part of an initial access procedure to gain access to the channel) and determine an angle of arrival for multi-path components. In some examples, the UE 215 may use a parameter extraction algorithm to extract (e.g., determine) the angle of arrival of multi-path components in the channel to construct the dynamic beam. For example, the UE 215 may use the parameter extraction algorithm to determine the angle of arrival of the multi-path components and then use an optimization algorithm to construct the dynamic beam.

The UE 215 may select the directional beams (e.g., virtual antennas) based on the angle of arrival of the multi-path components and the received power at each virtual antenna (e.g., used during the beam sweeping procedure). For example, the UE 215 may select the directional beams with a relatively high signal quality, or an otherwise acceptable signal quality, compared to other directional beams used during the beam sweeping procedure to construct the dynamic beam (e.g., to form the dynamic set of beamforming weights). In some examples, the UE 215 may select a directional beam based on whether the directional beam satisfies a performance metric, such as a link budget, an SPEFF, a BLER, an SINR, an SNR, or an RSRP. In the example of FIG. 2, the directional beam 220-a, the directional beam 220-b, and the directional beam 220-d may have a relatively high signal quality compared to the directional beam 220-c and the directional beam 220-e. As such, the UE may select the directional beam 220-a, the directional beam 220-b, and the directional beam 220-d to form a dynamic UE beam 225. The selected directional beams may be combined using a technique based on maximum ratio combining (e.g., using the maximum ratio combining concept), equal gain combining, or optimum combining (e.g., optimum combining strategies).

For example, the UE 215 may construct the dynamic UE beam 225 (e.g., the dynamic set of beamforming weights) using hybrid-beam selection and maximum ratio combining. In some examples of hybrid-beam selection and maximum ratio combining, the UE 215 may select a number (K) of beams with a relatively high signal quality (e.g., a relatively high RSRP value or a relatively high SINR value) or an otherwise acceptable signal quality compared to other directional beams. The selected beams (e.g., $b_{(1)} \ldots b_{(K)}$) may be represented by Equation 1, as follows:

$$B = [b_{(1)} \ldots b_{(K)}] \quad (1)$$

where $b_{(1)}$, may represent a beam design parameter. The UE 215 may construct a covariance matrix (R) between the observed signals received via the (K) selected beams. That is, the UE 215 may calculate the correlation between the (K) virtual antennas to construct a covariance matrix (R) of size K×K. The UE 215 may determine (e.g., find, compute, calculate) a dominant eigenvector (u) of the covariance matrix. The dominant eigenvector (u) may be a matrix of size K×1. The UE 215 may form the dynamic beam (g) according to Equation 2. That is, the UE 215 may combine the directional beams using Equation 2:

$$g = \frac{1}{|Bu|} Bu. \quad (2)$$

In some examples, hybrid-beam selection and maximum ratio combining may provide a reduction in the number of measurements to be performed by the UE 215 for determining a suitable combination of beamforming weights. For example, the number of measurements (e.g., and the duration of time) used to construct the dynamic set of beamforming weights may be reduced for hybrid-beam selection and maximum ratio combining compared to other techniques, such as static (e.g., directional) beam techniques or direct maximum ratio combining, for determining a suitable combination of beamforming weights. Additionally or alternatively, the fiftieth percentile of a rank-1 spectral efficiency for hybrid-beam selection and maximum ratio combining may be comparable to the fiftieth percentile of a rank-1 spectral efficiency for static beam techniques and direct maximum ratio combining, while providing a reduction in the number of measurements (e.g., and duration of time) used to construct the dynamic set of beamforming weights. That is, hybrid-beam selection and maximum ratio combining may provide a flexible technique for approaching a modeled set of beamforming weights. For example, hybrid-beam selection and maximum ratio combining may provide a reduction in the number of measurements used to construct the dynamic set of beamforming weights compared to other beamforming techniques, such as sweeping of static beams and direct maximum ratio combining. For instance, for a device with 32 antennas, hybrid-beam selection and maximum ratio combining may reduce the number of measurements by about half (e.g., by about 50 percent or a percentage greater than about 50). In some examples, the amount by which the measurements are reduced may depend on the number of selected beams (K), the method used to construct the dynamic beam weights, or both.

Additionally or alternatively, using hybrid-beam selection and maximum ratio combining to construct the dynamic set of beamforming weights may improve (e.g., boost) the SNR of measured signals (e.g., measured reference signals). In some examples (e.g., for a transceiver with 64 antenna elements), the ratio of post-beamforming SNR to pre-beamforming SNR for hybrid-beam selection and maximum ratio combining may be comparable to the ratio of post-beamforming SNR to pre-beamforming SNR for static beam techniques. For example, a resistance to noise at relatively low SNR values may be increased compared other beamforming techniques. For example, hybrid-beam selection and maximum ratio combining may provide a gain (e.g., of 13 dB with K=2) over direct maximum ratio combining. In some examples, the performance for hybrid-beam selection and maximum ratio combining may depend on the number (K) of combined beams. The number of combined beams may be greater than one (e.g., may range from 2 to a maximum number of static beam weights, such as 91). In some examples, as the number (K) of combined beams exceeds a threshold, relatively weak directional beams (e.g., relatively weak virtual antennas) of the number (K) of combined beams that exceed the threshold, may impact the performance of the UE 215. For example, the gain provided by hybrid-beam selection and maximum ratio combining (e.g., over direct maximum ratio combining) may be reduced (e.g., to 2.9 dB) for an increased number of combined beams (e.g., for K=91).

In some examples of hybrid-beam selection and maximum ratio combining, a beam pattern (e.g., a dynamic beam generated using the dynamic set of directional beamform weights) used by the UE 215 to receive signals may depend on the angle of arrival of the received signals (e.g., the multi-path components). For example, for a given multi-path component (e.g., or a set of multi-path components) the UE 215 may use a beam pattern that may increase the received power (e.g., the measured RSRP or the measured SINR) at the UE 215. That is, the receive power measured at the UE 215 may depend on the beam pattern used at the UE 215. Additionally or alternatively, the received power measured at the UE 215 may depend on whether the UE 215 is using static beams or a dynamic beam. Thus, hybrid-beam selection and maximum ratio combining may be used to increase the received signal power at the UE 215, thereby enhancing communications efficiency and throughput.

Figure 3:
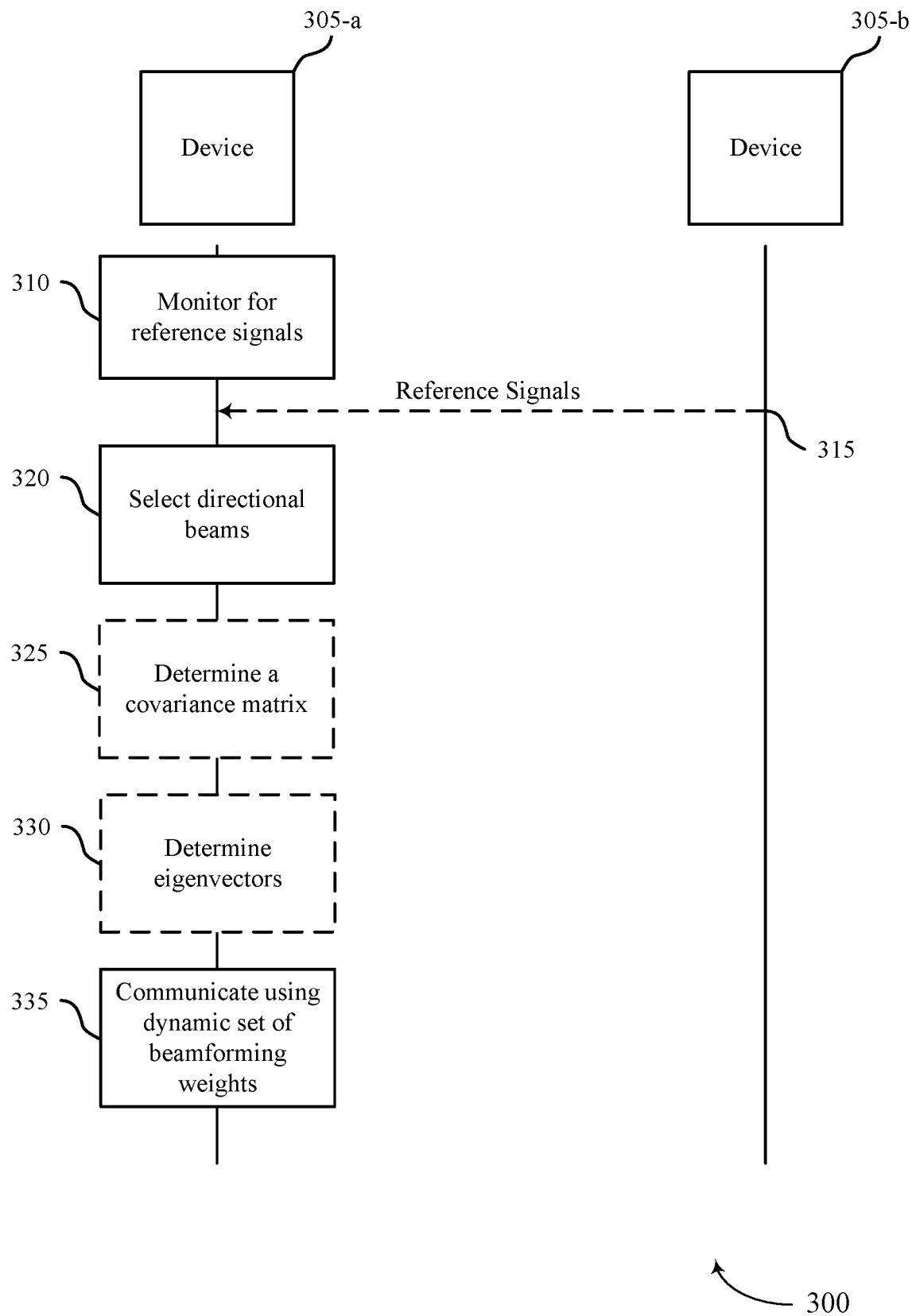
FIG. 3 illustrates an example of a process flow in a system that supports methods for dynamic beamforming weight construction based on directional measurements in accordance with aspects of the present disclosure.

FIG. 3 illustrates an example of a process flow 300 in a system that supports methods for dynamic beamforming weight construction based on directional measurements in accordance with aspects of the present disclosure. The process flow 300 may implement or be implemented by one or more aspects of the wireless communications system 100 and the wireless communications system 200. For example, the process flow 300 may include one or more devices 305 (e.g., a device 305-*a* and a device 305-*b*), which may be examples of a network entity or a UE described with reference to FIGS. 1 and 2. The process flow 300 may be implemented by the device 305-*a* or the device 305-*b*, or both. In the following description of the process flow 300, operations between the device 305-*a* and the device 305-*b* may occur in a different order or at different times than as shown. Some operations may also be omitted from the process flow 300, and other operations may be added to the process flow 300.

At 310, the device 305-*a* may monitor for a set of reference signals (e.g., a set of SSBs, a set of CSI-RSs, a set of DMRSs, or a set of SRSs) from the device using a set of directional beams. Each directional beam of the set may be an example of a directional beam described with reference to FIG. 2. For example, the device 305-*a* may generate the set of directional beams based on a respective set of beamforming weights. The respective set of beamforming weights may include a weighting applied to an antenna element of a subset of antenna elements at the device 305-*a*. As an example, at 315, the device 305-*b* may transmit reference signals (e.g., the set of reference signals) to the device 305-*a*, and the device 305-*a* may receive the set of reference signals using the set of directional beams.

At 320, the device 305-*a* may select a subset of directional beams from the set of directional beams. In some example, the device 305-*a* may select the subset of directional beams based on performing one or more measurements of the set of reference signals received on the set of directional beams. The subset of directional beams may be selected based on the measurements associated with a particular beam and one or more performance metrics (e.g., an SPEFF, a BLER, an SINR, and SNR, a RSRP). Additionally or alternatively, the subset of directional beams may be selected based on the measurements associated with a particular beam satisfying a threshold.

In some examples, at 325, the device 305-a may determine a covariance matrix associated with a subset of antenna elements of a set of antenna elements at the device 305-a. For example, the device 305-a may determine the covariance matrix based on the one or more measurements. The covariance matrix may be an example of a covariance matrix described with reference to FIG. 2. In some examples, at 330, the device 305-a may determine one or more eigenvectors associated with the covariance matrix. The one or more eigenvectors may satisfy a threshold. In some examples, the eigenvectors may be examples of dominant eigenvectors described with reference to FIG. 2.

At 335, the device 305-a may communicate (e.g., with the device 305-b) using a dynamic set of beamforming weights (e.g., one or more dynamic beams) that may be formed using a combination of beamforming weights from each set of beamforming weights associated with the subset of directional beams. The dynamic set of beamforming weights may be an example of a dynamic set of beamforming weights described with reference to FIG. 2. For example, the dynamic set of beamforming weights may be different from each set of beamforming weights associated with the subset of directional beams. In some examples, the combination may be formed using hybrid-beam selection and maximum ratio combining. For example, the combination may be based on the one or more eigenvectors (e.g., one or more dominant eigenvectors). As a result, the device 305-a may reduce processing and power consumption while improving performance. For example, the techniques as described herein may provide increased flexibility and gains compared to static beamforming techniques (e.g., or direct maximum ratio combining).

Figure 4:
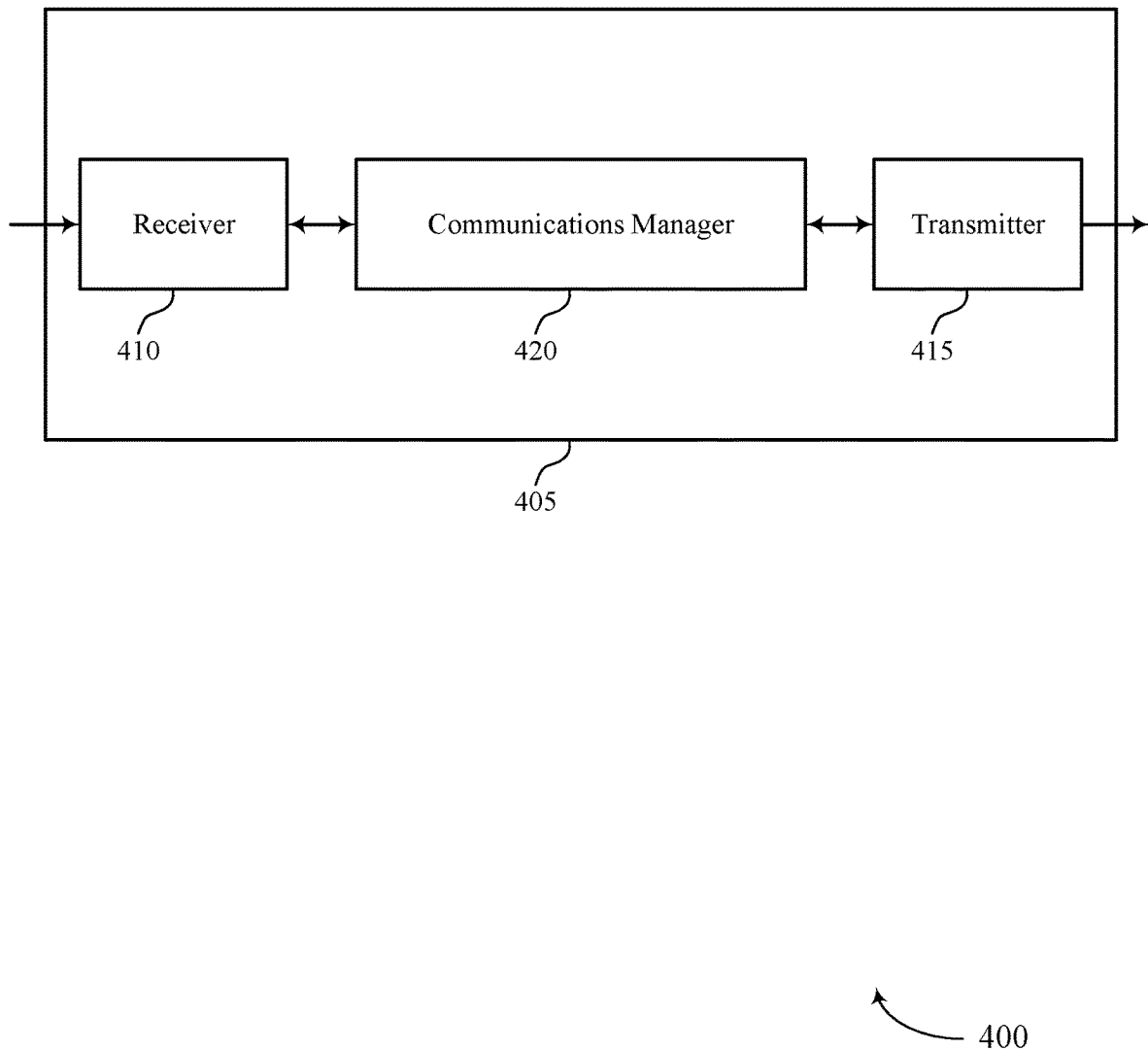
FIGS. 4 and 5 show block diagrams of devices that support methods for dynamic beamforming weight construction based on directional measurements in accordance with aspects of the present disclosure.

FIG. 4 shows a block diagram 400 of a device 405 that supports methods for dynamic beamforming weight construction based on directional measurements in accordance with aspects of the present disclosure. The device 405 may be an example of aspects of a device (e.g., a network entity or a UE) as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to methods for dynamic beamforming weight construction based on directional measurements). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to methods for dynamic beamforming weight construction based on directional measurements). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of methods for dynamic beamforming weight construction based on directional measurements as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first device (e.g., device 405) in accordance with examples as disclosed herein. For example, the communications manager 420 may be configured as or otherwise support a means for monitoring for a set of reference signals from a second device (e.g., another device 405) using a set of directional beams. The communications manager 420 may be configured as or otherwise support a means for selecting, by the first device, a subset of directional beams from the set of directional beams based on performing one or more measurements of the set of reference signals received on the set of directional beams, each directional beam of the subset of directional beams being associated with a set of beamforming weights. The communications manager 420 may be configured as or otherwise support a means for communicating with the second device using a dynamic set of beamforming weights that is formed using a combination of beamforming weights from each set of beamforming weights associated with the subset of directional beams, where the dynamic set of beamforming weights is different from each set of beamforming weights associated with the subset of directional beams.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power consumption, and more efficient utilization of communication resources.

Figure 5:
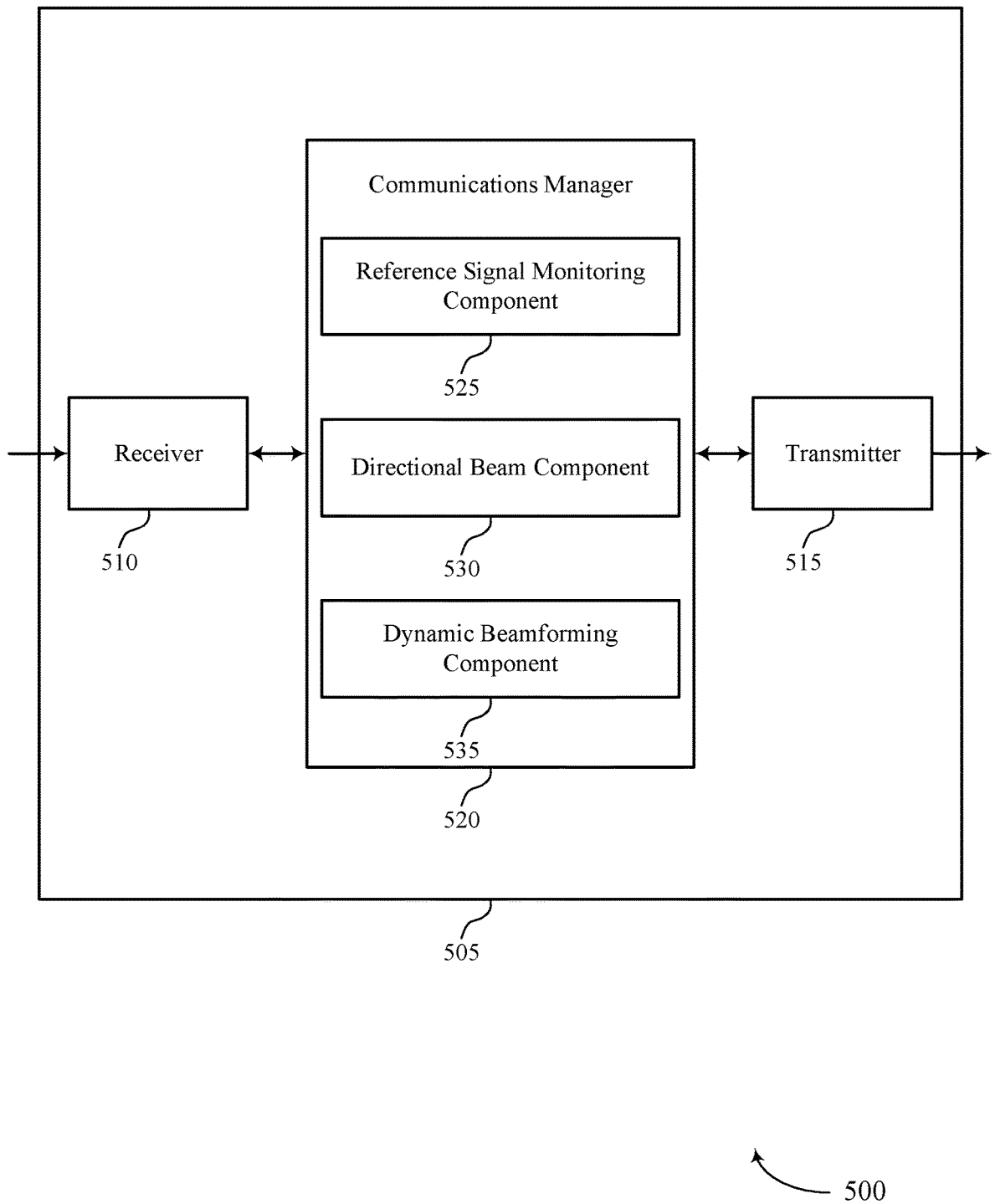

FIG. 5 shows a block diagram 500 of a device 505 that supports methods for dynamic beamforming weight construction based on directional measurements in accordance with aspects of the present disclosure. The device 505 may be an example of aspects of a device 405, a UE 115, or a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to methods for dynamic beamforming weight construction based on directional measurements). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to methods for dynamic beamforming weight construction based on directional measurements). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of methods for dynamic beamforming weight construction based on directional measurements as described herein. For example, the communications manager 520 may include a reference signal monitoring component 525, a directional beam component 530, a dynamic beamforming component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device (e.g., the device 505) in accordance with examples as disclosed herein. The reference signal monitoring component 525 may be configured as or otherwise support a means for monitoring for a set of reference signals from a second device (e.g., another device 505) using a set of directional beams. The directional beam component 530 may be configured as or otherwise support a means for selecting, by the first device, a subset of directional beams from the set of directional beams based on performing one or more measurements of the set of reference signals received on the set of directional beams, each directional beam of the subset of directional beams being associated with a set of beamforming weights. The dynamic beamforming component 535 may be configured as or otherwise support a means for communicating with the second device using a dynamic set of beamforming weights that is formed using a combination of beamforming weights from each set of beamforming weights associated with the subset of directional beams, where the dynamic set of beamforming weights is different from each set of beamforming weights associated with the subset of directional beams.

Figure 6:
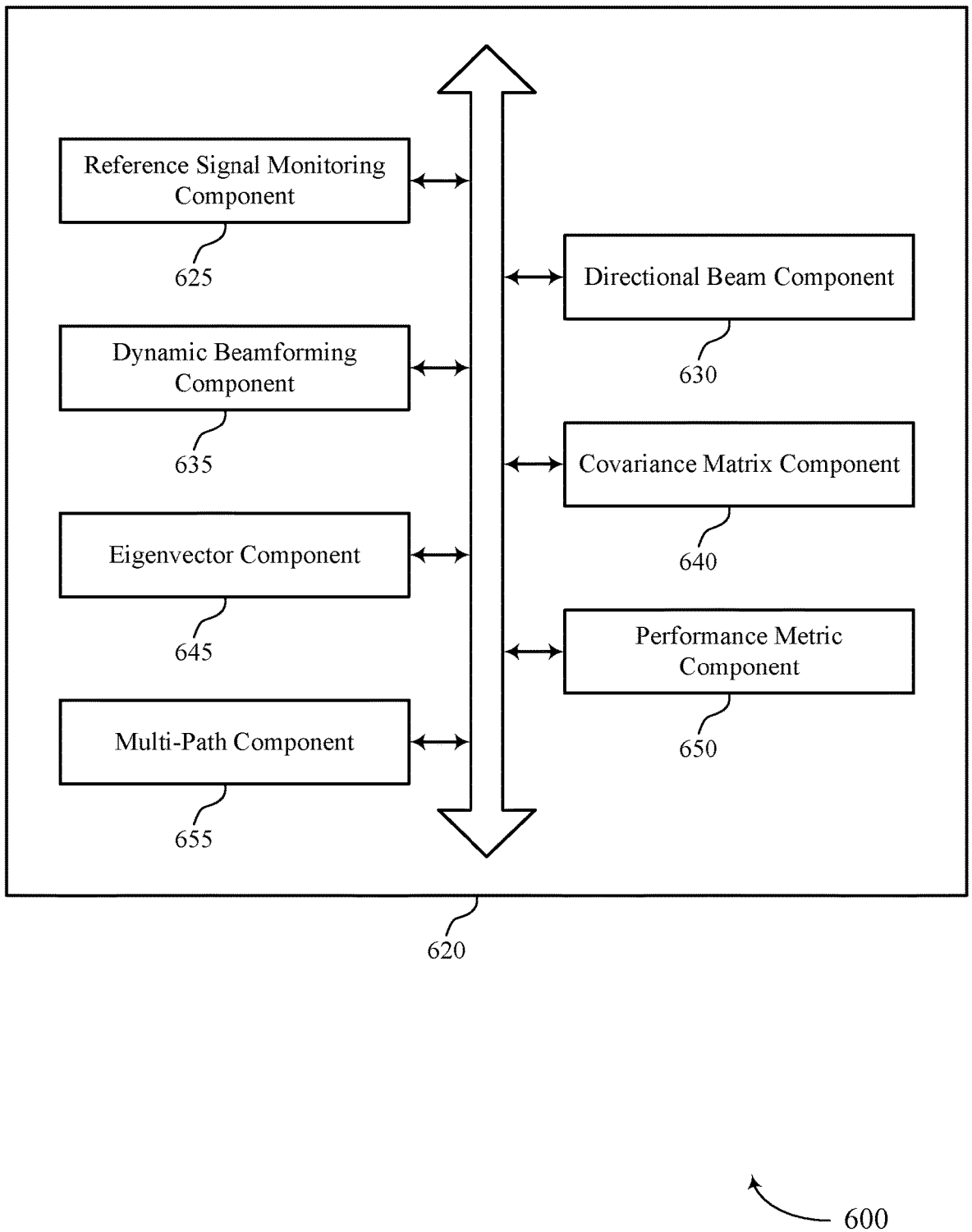
FIG. 6 shows a block diagram of a communications manager that supports methods for dynamic beamforming weight construction based on directional measurements in accordance with aspects of the present disclosure.

FIG. 6 shows a block diagram 600 of a communications manager 620 that supports methods for dynamic beamforming weight construction based on directional measurements in accordance with aspects of the present disclosure. The communications manager 620 may be an example of aspects of a communications manager 420, a communications manager 520, or both, as described herein. The communications manager 620, or various components thereof, may be an example of means for performing various aspects of methods for dynamic beamforming weight construction based on directional measurements as described herein. For example, the communications manager 620 may include a reference signal monitoring component 625, a directional beam component 630, a dynamic beamforming component 635, a covariance matrix component 640, an eigenvector component 645, a performance metric component 650, a multi-path component 655, or any combination thereof. Each of these components may communicate, directly or indirectly, with one another (e.g., via one or more buses).

The communications manager 620 may support wireless communication at a first device (e.g., a UE or a network entity) in accordance with examples as disclosed herein. The reference signal monitoring component 625 may be configured as or otherwise support a means for monitoring for a set of reference signals from a second device (e.g., another UE or another network entity) using a set of directional beams. The directional beam component 630 may be configured as or otherwise support a means for selecting, by the first device, a subset of directional beams from the set of directional beams based on performing one or more measurements of the set of reference signals received on the set of directional beams, each directional beam of the subset of directional beams being associated with a set of beamforming weights. The dynamic beamforming component 635 may be configured as or otherwise support a means for communicating with the second device using a dynamic set of beamforming weights that is formed using a combination of beamforming weights from each set of beamforming weights associated with the subset of directional beams, where the dynamic set of beamforming weights is different from each set of beamforming weights associated with the subset of directional beams.

In some examples, the covariance matrix component 640 may be configured as or otherwise support a means for determining, based on the one or more measurements, a covariance matrix associated with a subset of antenna elements of a set of antenna elements at the first device and each set of beamforming weights associated with the subset of directional beams. In some examples, the eigenvector component 645 may be configured as or otherwise support a means for determining one or more eigenvectors associated with the covariance matrix, where the one or more eigenvectors satisfy a threshold, and where the combination is based on the one or more eigenvectors.

In some examples, the directional beam component 630 may be configured as or otherwise support a means for generating each directional beam of the set of directional beams based on a respective set of beamforming weights, where each respective set of beamforming weights corresponds to a direction of a set of multiple directions, and where receiving the set of reference signals using the set of directional beams is based on generating each directional beam.

In some examples, each beamforming weight of the respective set of beamforming weights includes a weighting applied to an antenna element of a subset of antenna elements at the first device. In some examples, each reference signal of the set of reference signals corresponds to a multi-path component of a set of multi-path components, each multi-path component including a respective signal path between the first device and the second device.

In some examples, the multi-path component 655 may be configured as or otherwise support a means for determining an angle of arrival associated with each multi-path component of the set of multi-path components, where selecting the subset of directional beams is based on the angle of arrival associated with each multi-path component of the set of multi-path components. In some examples, the performance metric component 650 may be configured as or otherwise support a means for determining a performance metric associated with communications between the first device and the second device, where a number of directional beams including the subset of directional beams is based on the performance metric.

In some examples, the performance metric includes a link budget, an effective spectral efficiency, a block error rate, a signal-to-interference-plus-noise ratio, a signal-to-noise ratio, or a reference signal received power ratio. In some examples, to support selecting the subset of directional beams, the directional beam component 630 may be configured as or otherwise support a means for determining, based on the one or more measurements, one or more directional beams of the set of directional beams that satisfy a threshold, where the subset of directional beams includes the one or more directional beams that satisfy the threshold.

In some examples, the first device includes a network entity and each reference signal of the set of reference signals includes a sounding reference signal. In some examples, the first device includes a user equipment and each reference signal of the set of reference signals includes a synchronization signal block, a channel state information reference signal, or a demodulation reference signal, or any combination thereof.

In some examples, the one or more measurements include one or more reference signal received power measurements or one or more signal-to-interference-plus-noise ratio measurements. In some examples, the combination is based on maximum ratio combining, or equal gain combining, or one or more optimum combining strategies, or any combination thereof. In some examples, the first device includes a UE and each reference signal of the set of reference signals is transmitted using one or more mmW carrier frequencies. In some examples, the one or more mmW carrier frequencies are greater than about 24.25 GHz. In some examples, the first device includes a network entity and each reference signal of the set of reference signals is transmitted using one or more carrier frequencies.

Figure 7:
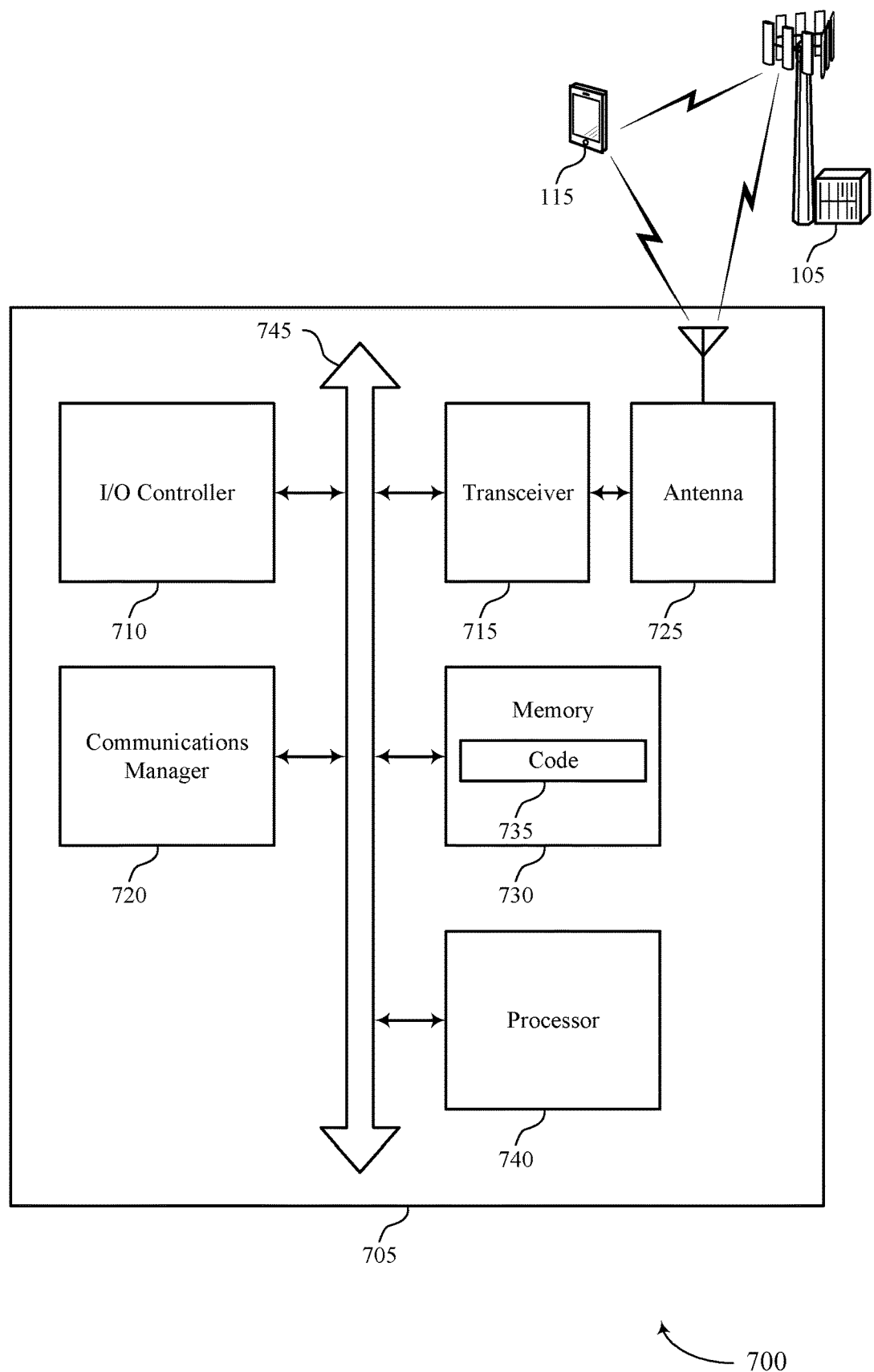
FIG. 7 shows a diagram of a system including a device that supports methods for dynamic beamforming weight construction based on directional measurements in accordance with aspects of the present disclosure.

FIG. 7 shows a diagram of a system 700 including a device 705 that supports methods for dynamic beamforming weight construction based on directional measurements in accordance with aspects of the present disclosure. The device 705 may be an example of or include the components of a device 405, a device 505, or a UE 115 as described herein. The device 705 may communicate wirelessly with one or more network entities 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting methods for dynamic beamforming weight construction based on directional measurements). For example, the device 705 or a component of the device 705 may include a processor 740 and memory 730 coupled with or to the processor 740, the processor 740 and memory 730 configured to perform various functions described herein.

The communications manager 720 may support wireless communication at a first device (e.g., the device 705) in accordance with examples as disclosed herein. For example, the communications manager 720 may be configured as or otherwise support a means for monitoring for a set of reference signals from a second device (e.g., another device 705) using a set of directional beams. The communications manager 720 may be configured as or otherwise support a means for selecting, by the first device, a subset of directional beams from the set of directional beams based on performing one or more measurements of the set of reference signals received on the set of directional beams, each directional beam of the subset of directional beams being associated with a set of beamforming weights. The communications manager 720 may be configured as or otherwise support a means for communicating with the second device using a dynamic set of beamforming weights that is formed using a combination of beamforming weights from each set of beamforming weights associated with the subset of directional beams, where the dynamic set of beamforming weights is different from each set of beamforming weights associated with the subset of directional beams.

By including or configuring the communications manager 720 in accordance with examples as described herein, the device 705 may support techniques for reduced latency, improved user experience related to reduced processing, reduced power consumption, more efficient utilization of communication resources, and longer battery life.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of methods for dynamic beamforming weight construction based on directional measurements as described herein, or the processor 740 and the memory 730 may be otherwise configured to perform or support such operations.

Figure 8:
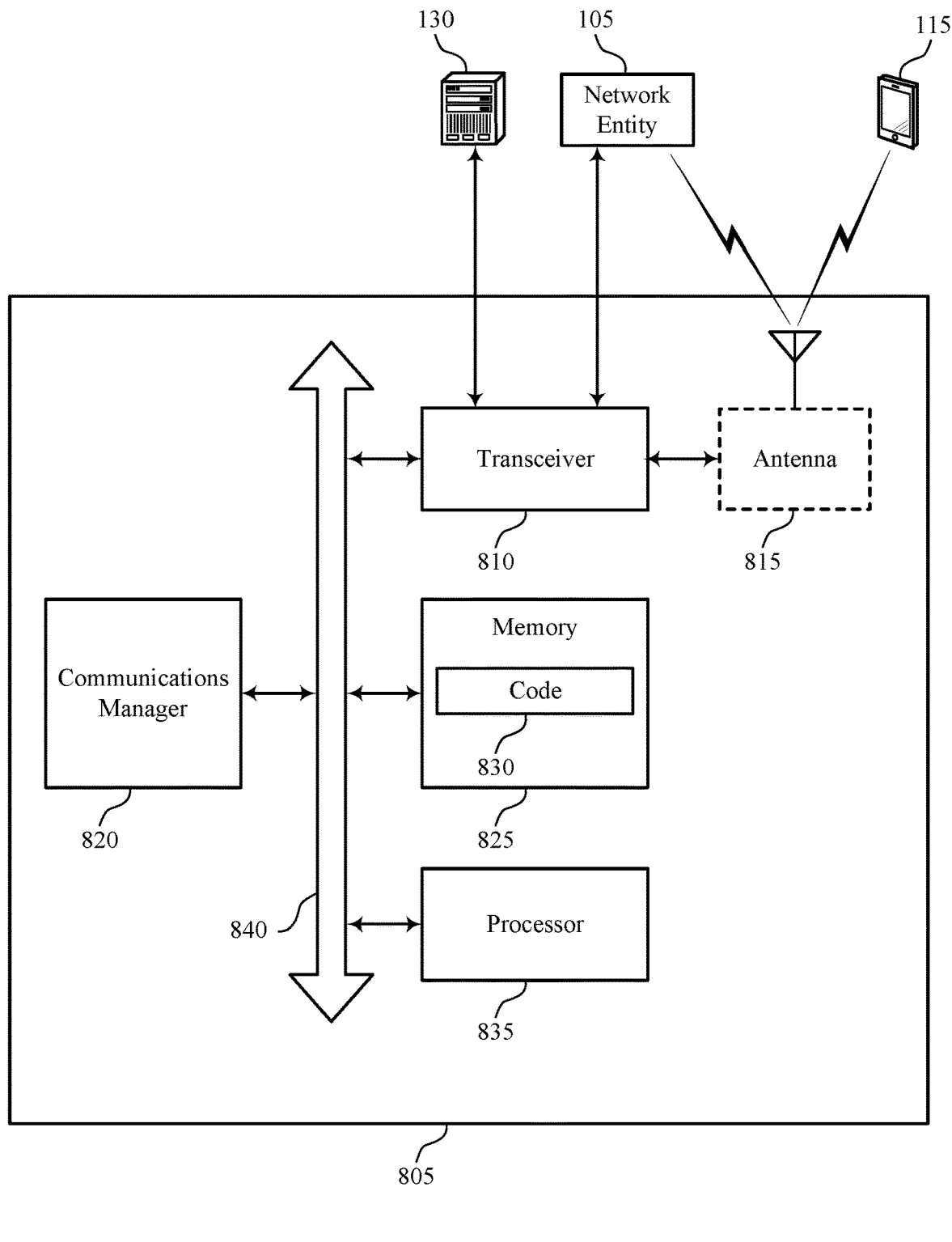
FIG. 8 shows a diagram of a system including a device that supports methods for dynamic beam construction based on directional measurements in accordance with aspects of the present disclosure.

FIG. 8 shows a diagram of a system 800 including a device 805 that supports methods for dynamic beam construction based on directional measurements in accordance with one or more aspects of the present disclosure. The device 805 may be an example of or include the components of a device 405, a device 505, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. The transceiver 810, or the transceiver 810 and one or more antennas 815 or wired interfaces, where applicable, may be an example of a transmitter 415, a transmitter 515, a receiver 410, a receiver 510, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting methods for dynamic beam construction based on directional measurements). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication at a first device in accordance with examples as disclosed herein. For example, the communications manager 820 may be configured as or otherwise support a means for monitoring for a set of reference signals from a second device using a set of directional beams. The communications manager 820 may be configured as or otherwise support a means for selecting, by the first device, a subset of directional beams from the set of directional beams based on performing one or more measurements of the set of reference signals received on the set of directional beams, each directional beam of the subset of directional beams being associated with a set of beamforming weights. The communications manager 820 may be configured as or otherwise support a means for communicating with the second device using a dynamic set of beamforming weights that is formed using a combination of beamforming weights from each set of beamforming weights associated with the subset of directional beams, where the dynamic set of beamforming weights is different from each set of beamforming weights associated with the subset of directional beams.

By including or configuring the communications manager 820 in accordance with examples as described herein, the device 805 may support techniques for reduced latency, improved user experience related to reduced processing, reduced power consumption, more efficient utilization of communication resources, and longer battery life. In some examples, through the selection of a dynamic directional beam, the communications manager 820 may provide for improved throughput achieved through forming an optimal directional beam for communications with one or more other communication devices.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the processor 835, the memory 825, the code 830, the transceiver 810, or any combination thereof. For example, the code 830 may include instructions executable by the processor 835 to cause the device 805 to perform various aspects of methods for dynamic beam construction based on directional measurements as described herein, or the processor 835 and the memory 825 may be otherwise configured to perform or support such operations.

Figure 9:
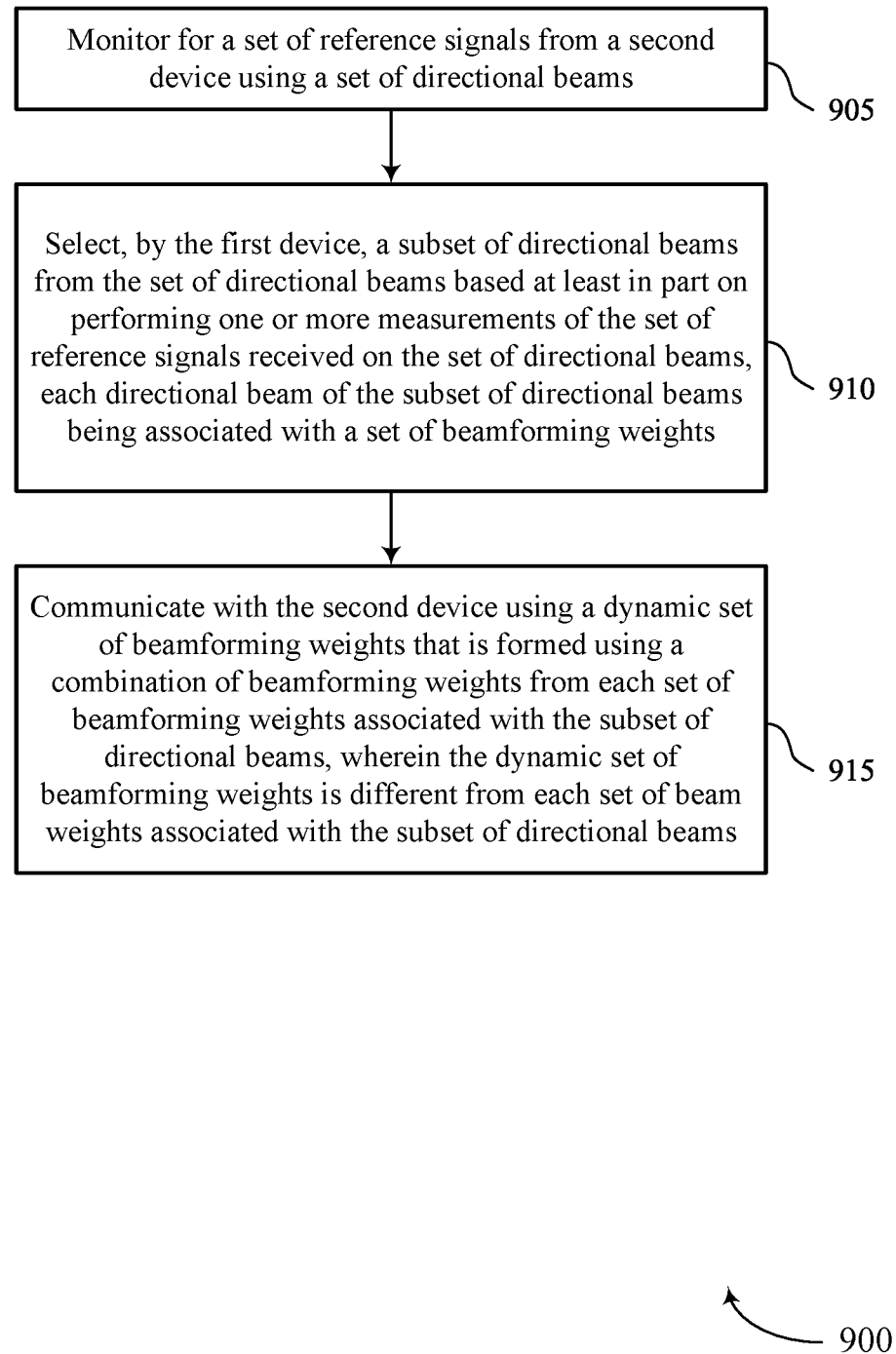
FIGS. 9 and 10 show flowcharts illustrating methods that support methods for dynamic beamforming weight construction based on directional measurements in accordance with aspects of the present disclosure.

FIG. 9 shows a flowchart illustrating a method 900 that supports methods for dynamic beamforming weight construction based on directional measurements in accordance with aspects of the present disclosure. The operations of the method 900 may be implemented by a UE or a network entity, or components of a UE or a network entity, as described herein. For example, the operations of the method 900 may be performed by a UE 115 or a network entity 105 as described with reference to FIGS. 1 through 7. In some examples, a UE or a network entity may execute a set of instructions to control the functional elements of the UE or the network entity, respectively, to perform the described functions. Additionally or alternatively, the UE or the network entity may perform aspects of the described functions using special-purpose hardware.

At 905, the method may include monitoring for a set of reference signals from a second device (e.g., another UE or another network entity) using a set of directional beams. The operations of 905 may be performed in accordance with examples as disclosed herein. In some examples, aspects of the operations of 905 may be performed by a reference signal monitoring component 625 as described with reference to FIG. 6.

At 910, the method may include selecting, by the first device, a subset of directional beams from the set of directional beams based on performing one or more measurements of the set of reference signals received on the set of directional beams, each directional beam of the subset of directional beams being associated with a set of beamforming weights. The operations of 910 may be performed in accordance with examples as disclosed herein. In some examples, aspects of the operations of 910 may be performed by a directional beam component 630 as described with reference to FIG. 6.

At 915, the method may include communicating with the second device using a dynamic set of beamforming weights that is formed using a combination of beamforming weights from each set of beamforming weights associated with the subset of directional beams, where the dynamic set of beamforming weights is different from each set of beamforming weights associated with the subset of directional beams. The operations of 915 may be performed in accordance with examples as disclosed herein. In some examples, aspects of the operations of 915 may be performed by a dynamic beamforming component 635 as described with reference to FIG. 6.

Figure 10:
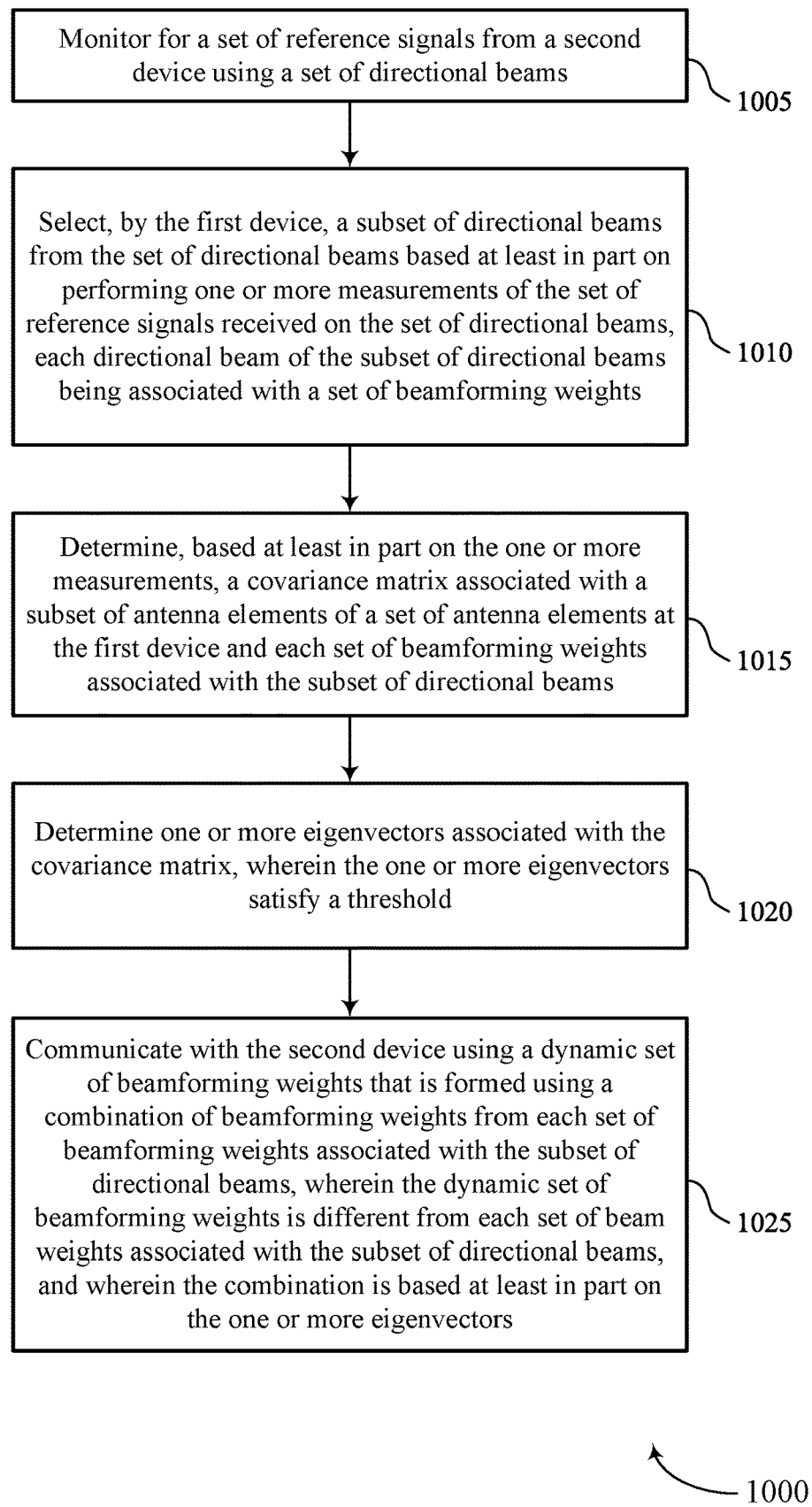

FIG. 10 shows a flowchart illustrating a method 1000 that supports methods for dynamic beamforming weight construction based on directional measurements in accordance with aspects of the present disclosure. The operations of the method 1000 may be implemented by a UE or a network entity, or the components of a UE or a network entity, as described herein. For example, the operations of the method 1000 may be performed by a UE 115 or a network entity 105 as described with reference to FIGS. 1 through 7. In some examples, a UE or a network entity may execute a set of instructions to control the functional elements of the UE or the network entity, respectively, to perform the described functions. Additionally or alternatively, the UE or the network entity may perform aspects of the described functions using special-purpose hardware.

At 1005, the method may include monitoring for a set of reference signals from a second device (e.g., another UE or another network entity) using a set of directional beams. The operations of 1005 may be performed in accordance with examples as disclosed herein. In some examples, aspects of the operations of 1005 may be performed by a reference signal monitoring component 625 as described with reference to FIG. 6.

At 1010, the method may include selecting, by the first device, a subset of directional beams from the set of directional beams based on performing one or more measurements of the set of reference signals received on the set of directional beams, each directional beam of the subset of directional beams being associated with a set of beamforming weights. The operations of 1010 may be performed in accordance with examples as disclosed herein. In some examples, aspects of the operations of 1010 may be performed by a directional beam component 630 as described with reference to FIG. 6.

At 1015, the method may include determining, based on the one or more measurements, a covariance matrix associated with a subset of antenna elements of a set of antenna elements at the first device and each set of beamforming weights associated with the subset of directional beams. The operations of 1015 may be performed in accordance with examples as disclosed herein. In some examples, aspects of the operations of 1015 may be performed by a covariance matrix component 640 as described with reference to FIG. 6.

At 1020, the method may include determining one or more eigenvectors associated with the covariance matrix, where the one or more eigenvectors satisfy a threshold. The operations of 1020 may be performed in accordance with examples as disclosed herein. In some examples, aspects of the operations of 1020 may be performed by an eigenvector component 645 as described with reference to FIG. 6.

At 1025, the method may include communicating with the second device using a dynamic set of beamforming weights that is formed using a combination of beamforming weights from each set of beamforming weights associated with the subset of directional beams, where the dynamic set of beamforming weights is different from each set of beamforming weights associated with the subset of directional beams, and where the combination is based on the one or more eigenvectors. The operations of 1025 may be performed in accordance with examples as disclosed herein. In some examples, aspects of the operations of 1025 may be performed by a dynamic beamforming component 635 as described with reference to FIG. 6.

The following provides an overview of aspects of the present disclosure:

Aspect 1: A method for wireless communication at a first device, comprising: monitoring for a set of reference signals from a second device using a set of directional beams; selecting, by the first device, a subset of directional beams from the set of directional beams based at least in part on performing one or more measurements of the set of reference signals received on the set of directional beams, each directional beam of the subset of directional beams being associated with a set of beamforming weights; and communicating with the second device using a dynamic set of beamforming weights that is formed using a combination of beamforming weights from each set of beamforming weights associated with the subset of directional beams, wherein the dynamic set of beamforming weights is different from each set of beam weights associated with the subset of directional beams.

Aspect 2: The method of aspect 1, further comprising: determining, based at least in part on the one or more measurements, a covariance matrix associated with a subset of antenna elements of a set of antenna elements at the first device and each set of beamforming weights associated with the subset of directional beams; and determining one or more eigenvectors associated with the covariance matrix, wherein the one or more eigenvectors satisfy a threshold, and wherein the combination is based at least in part on the one or more eigenvectors.

Aspect 3: The method of any of aspects 1 through 2, further comprising: generating each directional beam of the set of directional beams based at least in part on a respective set of beamforming weights, wherein each respective set of beamforming weights corresponds to a direction of a plurality of directions, and wherein receiving the set of reference signals using the set of directional beams is based at least in part on generating each directional beam.

Aspect 4: The method of aspect 3, wherein each beamforming weight of the respective set of beamforming weights comprises a weighting applied to an antenna element of a subset of antenna elements at the first device.

Aspect 5: The method of any of aspects 1 through 4, wherein each reference signal of the set of reference signals excites a multi-path component of a set of multi-path components, each multi-path component comprising a respective signal path between the first device and the second device.

Aspect 6: The method of aspect 5, further comprising: determining an angle of arrival associated with each multi-path component of the set of multi-path components, wherein selecting the subset of directional beams is based at least in part on the angle of arrival associated with each multi-path component of the set of multi-path components.

Aspect 7: The method of any of aspects 1 through 6, further comprising: determining a performance metric associated with communications between the first device and the second device, wherein a number of directional beams comprising the subset of directional beams is based at least in part on the performance metric.

Aspect 8: The method of aspect 7, wherein the performance metric comprises a link budget, an effective spectral efficiency, a block error rate, a signal-to-interference-plus-noise ratio, a signal-to-noise ratio, or a reference signal received power ratio.

Aspect 9: The method of any of aspects 1 through 8, wherein selecting the subset of directional beams comprises: determining, based at least in part on the one or more measurements, one or more directional beams of the set of directional beams that satisfy a threshold, wherein the subset of directional beams comprises the one or more directional beams that satisfy the threshold.

Aspect 10: The method of any of aspects 1 through 9, wherein the first device comprises a network entity and each reference signal of the set of reference signals comprises a sounding reference signal.

Aspect 11: The method of any of aspects 1 through 9, wherein the first device comprises a user equipment and each reference signal of the set of reference signals comprises a synchronization signal block, a channel state information reference signal, or a demodulation reference signal, or any combination thereof.

Aspect 12: The method of any of aspects 1 through 11, wherein the one or more measurements comprise one or more reference signal received power measurements or one or more signal-to-interference-plus-noise ratio measurements.

Aspect 13: The method of any of aspects 1 through 12, wherein the combination is based at least in part on maximum ratio combining, or equal gain combining, or one or more optimum combining strategies, or any combination thereof.

Aspect 14: The method of any of aspects 1 through 13, wherein the first device comprises a UE and each reference signal of the set of reference signals is transmitted using one or more millimeter wave carrier frequencies.

Aspect 15: The method of aspect 14, wherein the one or more millimeter wave carrier frequencies are greater than about 24.25 gigahertz.

Aspect 16: The method of any of aspects 1 through 13, wherein the first device comprises a network entity and each reference signal of the set of reference signals is transmitted using one or more carrier frequencies.

Aspect 17: An apparatus for wireless communication at a first device, comprising a processor; memory coupled with the processor; and instructions stored in the memory and executable by the processor to cause the apparatus to perform a method of any of aspects 1 through 16.

Aspect 18: An apparatus for wireless communication at a first device, comprising at least one means for performing a method of any of aspects 1 through 16.

Aspect 19: A non-transitory computer-readable medium storing code for wireless communication at a first device, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   monitoring for a set of reference signals from a second device using a set of measured beams;
   selecting, by the first device, a subset of measured beams from the set of measured beams based at least in part on performing one or more measurements of the set of reference signals received on the set of measured beams, each measured beam of the subset of measured beams being associated with a set of beamforming weights; and
   communicating with the second device using a dynamic set of beamforming weights that is formed using a combination of beamforming weights from each set of beamforming weights associated with the subset of measured beams, wherein the dynamic set of beamforming weights is different from each set of beamforming weights associated with the subset of measured beams;
   wherein the first device comprises a user equipment and each reference signal of the set of reference signals comprises a synchronization signal block, a channel state information reference signal, or a demodulation reference signal, or any combination thereof.

2. The method of claim 1, further comprising:
   determining, based at least in part on the one or more measurements, a covariance matrix associated with a subset of antenna elements of a set of antenna elements at the first device and each set of beamforming weights associated with the subset of measured beams; and
   determining one or more eigenvectors associated with the covariance matrix, wherein the one or more eigenvectors satisfy a threshold, and wherein the combination is based at least in part on the one or more eigenvectors.

3. The method of claim 1, further comprising:
   generating each measured beam of the set of measured beams based at least in part on a respective set of beamforming weights, wherein each respective set of beamforming weights corresponds to a direction of a plurality of directions, and wherein receiving the set of reference signals using the set of measured beams is based at least in part on generating each measured beam.

4. The method of claim 3, wherein each beamforming weight of the respective set of beamforming weights comprises a weighting applied to an antenna element of a subset of antenna elements at the first device.

5. The method of claim 1, wherein each reference signal of the set of reference signals corresponds to a multi-path component of a set of multi-path components, each multi-path component comprising a respective signal path between the first device and the second device.

6. The method of claim 5, further comprising:
   determining an angle of arrival associated with each multi-path component of the set of multi-path components, wherein selecting the subset of measured beams is based at least in part on the angle of arrival associated with each multi-path component of the set of multi-path components.

7. The method of claim 1, further comprising:
   determining a performance metric associated with communications between the first device and the second device, wherein a number of measured beams comprising the subset of measured beams is based at least in part on the performance metric.

8. The method of claim 7, wherein the performance metric comprises a link budget, an effective spectral efficiency, a block error rate, a signal-to-interference-plus-noise ratio, a signal-to-noise ratio, or a reference signal received power ratio.

9. The method of claim 1, wherein selecting the subset of measured beams comprises:
   determining, based at least in part on the one or more measurements, one or more directional beams of the set of measured beams that satisfy a threshold, wherein the subset of measured beams comprises the one or more measured beams that satisfy the threshold.

10. The method of claim 1, wherein the one or more measurements further comprise one or more reference signal received power measurements or one or more signal-to-interference-plus-noise ratio measurements.

11. The method of claim 1, wherein the combination is based at least in part on maximum ratio combining, or equal gain combining, or one or more optimum combining strategies, or any combination thereof.

12. The method of claim 1, wherein each reference signal of the set of reference signals is transmitted using one or more millimeter wave carrier frequencies.

13. The method of claim 12, wherein the one or more millimeter wave carrier frequencies are greater than about 24.25 gigahertz.

14. An apparatus for wireless communication at a first device, comprising:
a processor;
memory coupled with the processor; and
instructions stored in the memory and executable by the processor to cause the apparatus to:
monitor for a set of reference signals from a second device using a set of measured beams;
select, by the first device, a subset of measured beams from the set of measured beams based at least in part on performing one or more measurements of the set of reference signals received on the set of measured beams, each measured beam of the subset of measured beams being associated with a set of beamforming weights; and
communicate with the second device using a dynamic set of beamforming weights that is formed using a combination of beamforming weights from each set of beamforming weights associated with the subset of measured beams, wherein the dynamic set of beamforming weights is different from each set of beamforming weights associated with the subset of measured beams;
wherein the first device comprises a user equipment and each reference signal of the set of reference signals comprises a synchronization signal block, a channel state information reference signal, or a demodulation reference signal, or any combination thereof.

15. The apparatus of claim 14, wherein the instructions are further executable by the processor to cause the apparatus to:
determine, based at least in part on the one or more measurements, a covariance matrix associated with a subset of antenna elements of a set of antenna elements at the first device and each set of beamforming weights associated with the subset of measured beams; and
determine one or more eigenvectors associated with the covariance matrix, wherein the one or more eigenvectors satisfy a threshold, and wherein the combination is based at least in part on the one or more eigenvectors.

16. The apparatus of claim 14, wherein the instructions are further executable by the processor to cause the apparatus to:
generate each measured beam of the set of measured beams based at least in part on a respective set of beamforming weights, wherein each respective set of beamforming weights corresponds to a direction of a plurality of directions, and wherein receiving the set of reference signals using the set of measured beams is based at least in part on generating each measured beam.

17. The apparatus of claim 16, wherein each beamforming weight of the respective set of beamforming weights comprises a weighting applied to an antenna element of a subset of antenna elements at the first device.

18. The apparatus of claim 14, wherein each reference signal of the set of reference signals corresponds to a multi-path component of a set of multi-path components, each multi-path component comprising a respective signal path between the first device and the second device.

19. The apparatus of claim 18, wherein the instructions are further executable by the processor to cause the apparatus to:
determine an angle of arrival associated with each multi-path component of the set of multi-path components, wherein selecting the subset of measured beams is based at least in part on the angle of arrival associated with each multi-path component of the set of multi-path components.

20. The apparatus of claim 14, wherein the instructions are further executable by the processor to cause the apparatus to:
determine a performance metric associated with communications between the first device and the second device, wherein a number of measured beams comprising the subset of measured beams is based at least in part on the performance metric.

21. The apparatus of claim 20, wherein the performance metric comprises a link budget, an effective spectral efficiency, a block error rate, a signal-to-interference-plus-noise ratio, a signal-to-noise ratio, or a reference signal received power ratio.

22. The apparatus of claim 14, wherein the instructions to select the subset of beams are executable by the processor to cause the apparatus to:
determine, based at least in part on the one or more measurements, one or more measured beams of the set of measured beams that satisfy a threshold, wherein the subset of measured beams comprises the one or more measured beams that satisfy the threshold.

23. The apparatus of claim 14, wherein:
the one or more measurements further comprise one or more reference signal received power measurements or one or more signal-to-interference-plus-noise ratio measurements.

24. An apparatus for wireless communication at a first device, comprising:
means for monitoring for a set of reference signals from a second device using a set of measured beams;
means for selecting, by the first device, a subset of measured beams from the set of measured beams based at least in part on performing one or more measurements of the set of reference signals received on the set of measured beams, each measured beam of the subset of measured beams being associated with a set of beamforming weights; and
means for communicating with the second device using a dynamic set of beamforming weights that is formed using a combination of beamforming weights from each set of beamforming weights associated with the subset of measured beams, wherein the dynamic set of beamforming weights is different from each set of beamforming weights associated with the subset of measured beams;
wherein the first device comprises a user equipment and each reference signal of the set of reference signals comprises a synchronization signal block, a channel state information reference signal, or a demodulation reference signal, or any combination thereof.

25. A non-transitory computer-readable medium storing code for wireless communication at a first device, the code comprising instructions executable by a processor to:
monitor for a set of reference signals from a second device using a set of measured beams;
select, by the first device, a subset of measured beams from the set of beams based at least in part on performing one or more measurements of the set of reference signals received on the set of measured beams, each measured beam of the subset of measured beams being associated with a set of beamforming weights; and communicate with the second device using a dynamic set of beamforming weights that is formed using a combination of beamforming weights from each set of beamforming weights associated with the subset of measured beams, wherein the dynamic set of beamforming weights is different from each set of beamforming weights associated with the subset of measured beams;

wherein the first device comprises a user equipment and each reference signal of the set of reference signals comprises a synchronization signal block, a channel state information reference signal, or a demodulation reference signal, or any combination thereof.

* * * * *